April 8, 1952 — W. Y. STAMPER — 2,592,209
CARRYING CASE FOR PORTABLE BATTERIES
Original Filed Jan. 29, 1946
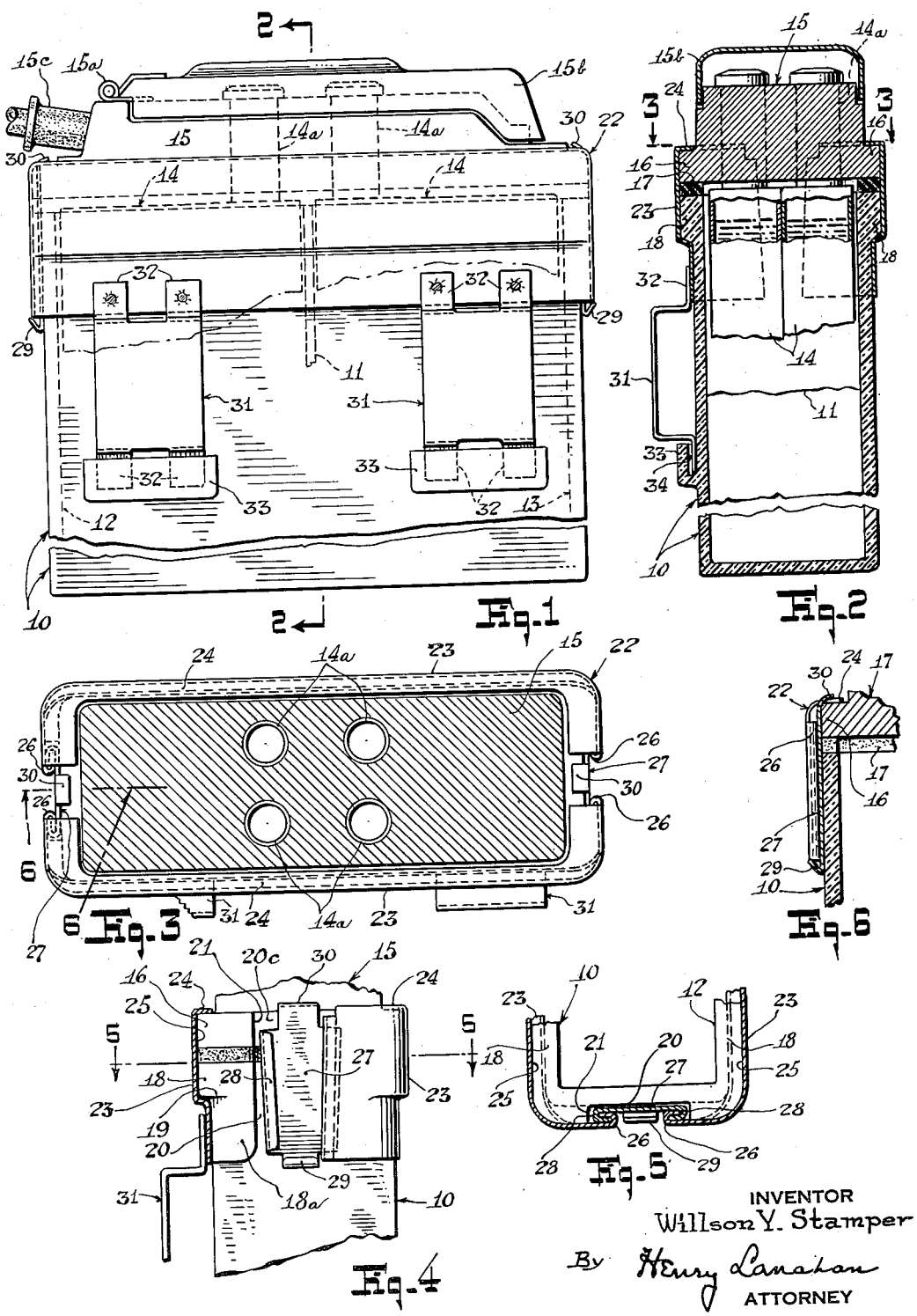
INVENTOR
Willson Y. Stamper
By Henry Lanahan
ATTORNEY Patented Apr. 8, 1952

2,592,209

UNITED STATES PATENT OFFICE 2,592,209

CARRYING CASE FOR PORTABLE BATTERIES

Willson Y. Stamper, Newark, N. J., assignor to Thomas A. Edison, Incorporated, West Orange, N. J., a corporation of New Jersey Original application January 29, 1946, Serial No. 644,062. Divided and this application September 29, 1949, Serial No. 118,611.

2 Claims. (Cl. 224—5)

This application is a division of my pending application, Serial No. 644,062, filed January 29, 1946 and entitled "Portable Battery."

This invention relates to carrying cases for portable batteries, especially for mine lamp batteries, and relates particularly to a novel band arrangement for securing the lid and suitable carrying members to the lower section of the case.

Cases for mine lamp batteries have to be very strong, durable and rugged in order that they may withstand heavy shocks, abrasions and other rough usage typical in the mining field. In the present instance, the case is made of a strong, tough, thermoplastic material, and the lid and carrying members of the case are secured firmly to the lower case section by means of a novel retaining band formed in sections and drawn tightly onto the case by novel tensioning members.

Objects of my invention are to provide a durable and rugged carrying case for portable batteries, and to provide especially a simple, economical and rugged means for firmly securing the lid, and suitable carrying members, to the lower case section.

These and other objects and features of my invention will be apparent from the following description and the appended claims.

In the description of my invention reference is had to the accompanying drawings, of which:

Figure 1 is a side elevational view, partly broken away, of a portable battery case incorporating my invention;

Figure 2 is a vertical section taken substantially on the line 2—2 of Figure 1;

Figure 3 is a horizontal section taken substantially on the line 3—3 of Figure 2;

Figure 4 is a fractional end view, with parts broken away, illustrating features of my invention;

Figure 5 is a fractional view with parts in section as they appear from the line 5—5 of Figure 4; and Figure 6 is a fractional detailed section taken on the line 6—6 of Figure 3.

The present battery case includes an oblong case section 10 open at the top and rectangular in shape. This case section is preferably made of thermoplastic material. A very suitable material for this purpose is a polymerized condensation product of hexamethylene diamine and adipic acid, known commercially as nylon. This thermoplastic material is very strong and hard yet highly resistant to shocks and abrasions and relatively light, all of which are highly desirable properties for a portable case that is subjected normally to rough usage. This case section has a transverse vertical partitioning wall 11, partially shown in Figure 1, which rigidifies the case and divides the interior space thereof into two compartments 12 and 13. In each of these compartments there are placed two battery cells 14 typically of the nickel-iron-alkaline type. The cells are provided respectively with upstanding filler tubes 14a.

The case section 10 is closed by a lid 15 which is also made preferably of nylon. This lid has a central upstanding body portion provided with apertures to receive the filler tubes 14a. Hinged to this lid at 15a is a metal cover 15b openable to expose the filler tubes, and leading out from the lid is a cable 15c for connecting the battery to a portable lamp or similar device. The lid 15 has a lower rim 16 which seats on a gasket 17 which in turn lies on the top edge of the case section 10. The case section 10 has an outwardly extending rib 18 at its upper edge along each side of the case section and around the adjacent corners thereof. The bottom edges of these ribs form external shoulders 19 on the case section 10 along its side and corner portions. In each end wall of the case section 10 there is an external recess 20 which runs through the top edge of the case section. The bottom wall of each recess 20 is flush with the major portion of each end wall of the case section. Also, in the rim of the lid there are notches 20c which form upward extensions of the recesses 20 when the lid is in mounted position. These recesses have square edges forming vertical shoulders 21 on the case. In order that these recesses may be of a suitable length, as will appear, the ribs 18 have downwardly-extending lobes 18a on each end wall of the case section 10 (Figure 4).

The lid 15 is secured tightly to the case section 10 by a metal retaining band 22 which is of novel construction and which cooperates in a novel manner with the case as is herein described. This retaining band comprises two identical straps 23 which conform respectively to the opposite sides and corner portions of the case and which extend just beyond the shoulders 21. Each strap has a turned-in edge 24 at the top and has an inset strip at the bottom to form a channel 25. When each strap is drawn tightly against the case the channel embraces the rim 16 of the lid and the adjacent rib 18 of the case section 10 to secure the lid in place.

The end portions of each strap 23 are bent inwardly to form hooks 26 which lie in the side portions of the recesses 20 (Figure 5). The straps are of thin metal, say .020" thick, and when pressed onto the case into their mounted positions the hooked end portions thereof spring outwardly and slide over the corner portions of the ribs 18, and then snap inwardly into the recesses 20 when the straps are in their mounted positions. The hooks 26 are inclined to the central medial plane of the case in such manner that the adjacent hooks of the two straps diverge from each other in going in the direction from the bottom to the top of the case (Figure 4).

Positioned in the recesses 20 are tapered tensioning members 27 for drawing the straps tightly onto the case. These tensioning members are flat metal plates having opposite side edges thereof turned over to form hooks 28 which diverge also in going in the direction from the bottom to the top of the case. The hooks 28 slidably interlock with the adjacent hooks 26 on the straps (Figures 4 and 5). Since the hooks are inclined as described, each tensioning member serves to draw the adjacent ends of the straps together as the tensioning member is forced upwardly into a tightened position within the respective recess 20 (Figure 4).

Each tensioning member 27 has a lug 29 turned outwardly at the bottom which can be struck, as by a hammer, to drive the tensioning member into a tightened position. At the upper end of each tensioning member there is a locking tab 30. This tab is originally straight with the central flat portion of the tensioning member, but upon the tensioning member being forced into a tightened position, this tab is struck as by a hammer and bent over the rim of the lid 15 to lock the tensioning member in place.

The retaining band above described is of a rugged and durable construction which can be readily assembled and tightened onto the case to secure the lid firmly to the lower case section by the use merely of a hammer or similar tool. Furthermore, this retaining band can be readily removed with the use of a tool, such as a screw driver, without damaging the band. This removal is performed by striking the bottom lug of each tensioning member to drive it downwardly out of engagement with the straps 23. As this is done the tab 30 is bent outwardly across the rim of the lid. However, when the tensioning member has been removed the locking tab can be straightened to enable the tensioning member to be used again in the manner above described.

At one side of the case there are two lugs or brackets 31 by which the portable battery is to be carried as by a belt not shown. These are shallow U-shaped brackets having two ears 32 bent outwardly at each end. One pair of ears is secured permanently to one of the straps 23, as by spot welding, in positions wherein the brackets depend from the strap and are spaced from the adjacent side wall of the case (Figure 1). Molded to the side wall of the case section 10 are outwardly-projecting hollow bosses 33 open at the top to form pockets 34 for receiving the lower ears of the respective brackets. In assembling the strap to which these brackets are secured, the lower ears of the brackets are first inserted in the pockets 34 and then the strap is snapped onto the case, in the manner above described, and thereupon it and the other strap are drawn tightly onto the case by the tensioning members above described.

The securing of the carrying brackets to the retaining band and to the case in the manner above described is permitted because of the high strength of the material used for the case and of the rugged construction of the band. This manner of securing the carrying brackets provides not only a strong, durable attachment of the brackets to the case but also one which is economical and easy to assemble.

The embodiment of my invention hereinabove described is intended to be illustrative and not necessarily limitative of my invention since the same is subject to changes and modifications without departure from the scope of my invention, which I endeavor to express according to the following claims.

I claim:

1. In a carrying case for a portable battery: the combination of a lower case section open at the top, said case section having at its upper end two outwardly-extending ribs respectively along opposite sides thereof and having external recesses in its opposite end walls extending downwardly from the top edge thereof; a lid on said case section for closing the latter; a metal retaining band embracing the upper portion of said lid for securing said lid to said case section, said band comprising two straps extending along opposite sides and around the corners of said case, each of said straps having a channel portion embracing one of said ribs and the adjacent portion of said lid and having inwardly-bent, hooked end portions along the major portion of the width thereof lying in said recesses respectively, said hooked end portions being inclined to the central medial plane of the case so that the hooked end portions in each recess diverge from each other in going in the direction from the bottom to the top of the case; tensioning members in said recesses having diverging hooked end portions slidably interlocked with the hooked end portions of said straps and effective to draw the straps against the case as the tensioning members are forced upwardly into said recesses; and tabs on the upper ends of said tensioning members adapted to be bent over the edge of said lid to hold the tensioning members in their tightened positions.

2. The combination set forth in claim 1 including brackets secured permanently to one of said straps in depending relation thereto and in spaced relation to the side wall of said lower case section, said lower case section having pockets detachably receiving the lower end portions of said brackets.

WILLSON Y. STAMPER.

REFERENCES CITED

The following references are of record in the file of this patent:

UNITED STATES PATENTS

| Number | Name | Date |
|---|---|---|
| 506,928 | Newman | Oct. 17, 1893 |
| 1,089,754 | Feeny | Mar. 10, 1914 |
| 1,440,690 | McMosiman | Jan. 2, 1923 |
| 1,449,940 | Hackney | Mar. 27, 1923 |
| 1,589,074 | Harris | June 15, 1926 |
| 1,642,010 | Carvalho | Sept. 13, 1927 |
| 1,792,280 | Cornell | Feb. 10, 1931 |
| 1,806,477 | Lloyd et al. | May 19, 1931 |
| 2,190,601 | La Van | Feb. 13, 1940 |
| 2,215,076 | Ashe | Sept. 17, 1940 |
| 2,404,777 | Gaines | July 30, 1946 |

FOREIGN PATENTS

| Number | Country | Date |
|---|---|---|
| 642,596 | France | May 6, 1928 |
| 671,146 | France | Aug. 31, 1929 |